Aug. 10, 1954     K. W. BRANDAU     2,685,904
WHITE SIDEWALL TIRE CONSTRUCTION
Filed May 3, 1952
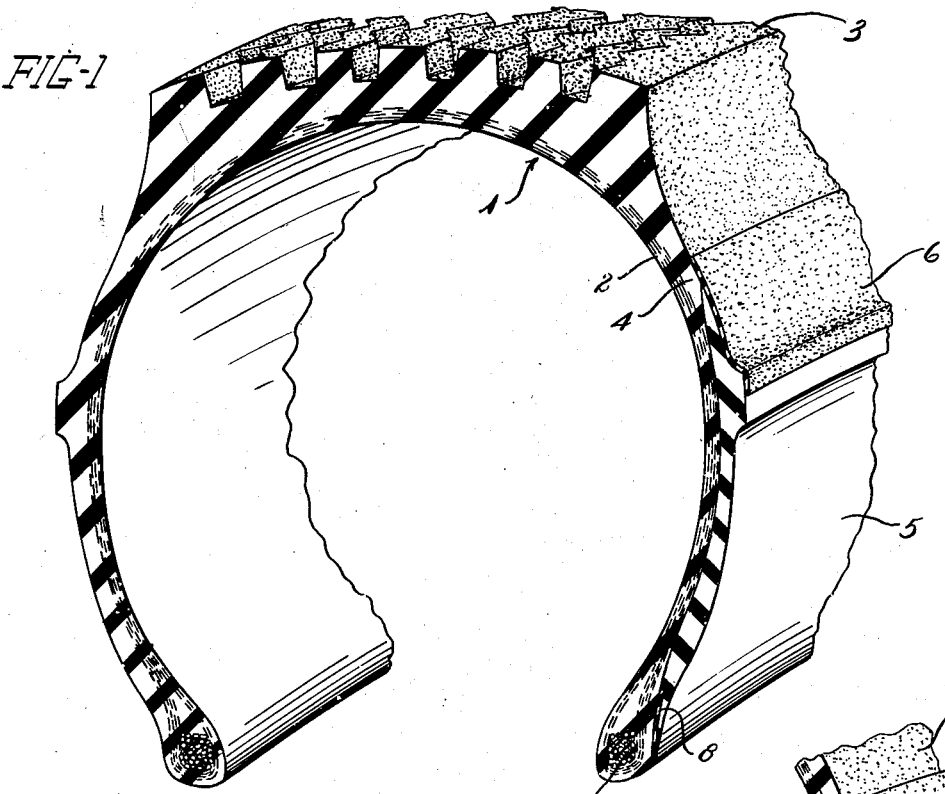
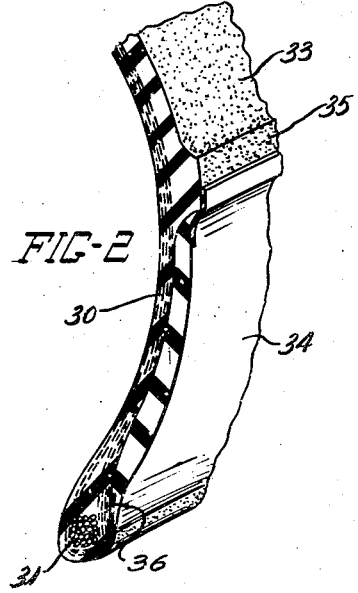
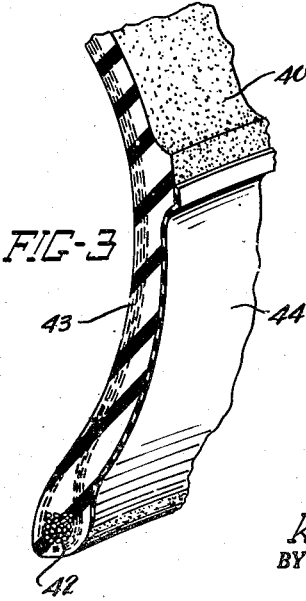
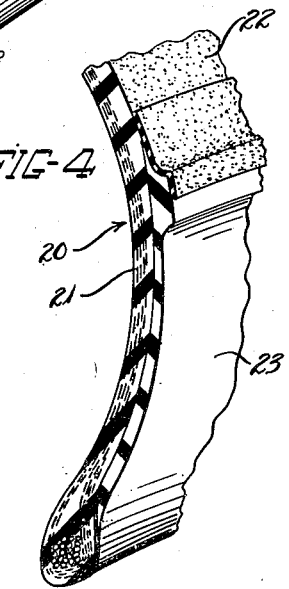
INVENTOR.
KARL W. BRANDAU
BY
*Ely, Frye & Hamilton*
ATTYS- Patented Aug. 10, 1954

2,685,904

UNITED STATES PATENT OFFICE 2,685,904

WHITE SIDEWALL TIRE CONSTRUCTION

Karl William Brandau, Cuyahoga Falls, Ohio, assignor to The Firestone Tire & Rubber Company, Akron, Ohio, a corporation of Ohio Application May 3, 1952, Serial No. 285,967

6 Claims. (Cl. 152—330)

This invention relates to light sidewall, pneumatic tires and more particularly to a novel sidewall construction and a method of making such a construction in a light sidewall, pneumatic tire.

Thin sheets of a rubber compound which contain no reinforcing carbon black, such as the sheet of white rubber used as a white sidewall member of a white sidewall tire, are extremely susceptible to failure from weather checking and radial cracking during road operation of the tire. Weather checking and radial cracking are crazings or fissures formed on the surface of rubber by exposure to the action of heat, sunlight and air, and aggravated by tire flexing. Such fissures and crazing lead to a shortening of tire life.

In order to prevent weather checking and radial cracking it has been found expedient to provide for a flexible film of wax which would be present at all times on the surface of the white sidewall member. This is difficult, however, because during road operation of the white sidewall tire the film of wax is soon scuffed or rubbed off in spots by curb rubbing and the like. The lost wax must be replaced for continuous protection of the sidewall surface and this replacement has been accomplished by migration of wax from inner portions of the white sidewall member to form a so-called bloom on the surface thereof. The thinner the white sidewall member the less storage space for replacement wax for such migration, and the earlier in tire life the supply of wax will be spent. Consequently, any proposal to reduce the thickness of the white sidewall member has been impractical because the reduction of wax storage volume results in early exhaustion of the migrating wax supply leading to early failure of the sidewall from weather checking and radial cracking.

Reduction of thickness is desirable, however, because a white sidewall compound embodying costly pigments, is expensive. The more of such a compound used in a tire the more expensive the tire will be. Conversely, any reduction of thickness in the white sidewall layer will result in a cost saving in the manufacture of the tire.

The use of wax in the fabric body plies of the white sidewall tire to supply a reservoir of wax for migration to the surface of the white sidewall member has been tried. Such an expedient has not been practical, however, because wax in the rubber of the plies migrates rapidly to the ply surface during factory storage preparatory to tire building with a resultant destruction of the building tack of the plies and complication of the tire building operation in that the plies will not adhere satisfactorily to each other.

Reduction of the thickness of the white sidewall member is also desirable for reasons other than cost. For example, it has been proposed to construct a white sidewall tire with a black buffing rib approximately midway between the bead and tread area, framing the white portion of the sidewall. In a sidewall construction of this type one difficulty of manufacture lies in symmetrically locating the juncture line between the white sidewall member and the black rib. Before this invention the construction of such a tire was accomplished by molding a black rubbery non-staining rib and stitching it to the fabric body during the tire building operation. The white sidewall member having been previously formed in a flat shape was then stitched to the tire carcass, with one edge of said member abutting the black rib and the other edge abutting the bead portion of the tire. A white gum strip was laid over the abutting edge of the black rib and white sidewall member and the tire vulcanized in a mold. The cured white gum strip was then buffed off of the black rib exposing a line of juncture between the black stock and the white stock. This line was usually irregular because of the flow of white stock of the white sidewall into the zone of the black rib. Accidentally buffing too deeply into the black rib aggravates the irregularity of the wavy line of juncture between the black and the white stock. Because of the contrast in color between white and black any irregularity in the juncture line is rendered more prominent.

According to the present invention, all of the above difficulties are overcome by using only a relatively thin veneer of white sidewall stock, the balance of the portion of the sidewall which would ordinarily be composed of white sidewall stock being made up of a black stock which is capable of supplying wax to the white sidewall by migration.

It is, therefore, an object of this invention to provide a construction for a pneumatic, light colored sidewall tire which will eliminate the defects of the prior art light sidewall construction. It is also an object of this invention to provide a white sidewall of thin veneer construction superimposed upon a cheap non-staining rubbery backing stock rather than on the outer fabric layer. It is a further object of this invention to provide a white sidewall construction for a pneumatic white sidewall tire incorporating a less number of elements than the white sidewall construction heretofore used. Yet another object of this invention is to provide a white sidewall tire construction whereby certain elements in the bead construction of the tire may be eliminated and replaced with an extension of an underlying black sidewall member.

A more specific object of this invention is to provide in a pneumatic white sidewall tire a white sidewall member superimposed upon a non-staining rubbery layer serving as a reservoir for waxy materials which migrate to the outer surface of the white sidewall during tire life.

Yet a further object of this invention is to provide a construction for a black rib white sidewall whereby the line of juncture between the black stock and the white stock is substantially regular completely around the tire. Another object of this invention is to provide a construction and method for forming a uniform line of juncture between the white and the black stock of the white sidewall of a pneumatic tire.

These and other objects are obtained by the present invention, preferred forms of which are described in the following specification, and illustrated in the drawings, in which:

Figure 1 is a fragmentary sectional view, in perspective, of a conventional white rib white sidewall tire, prior to buffing of the rib.

Figure 2 is a fragmentary sectional view, in perspective, of a white sidewall tire according to this invention, embodying a conventional black rib construction.

Figure 3 is a fragmentary sectional view, in perspective, of another black rib, white sidewall tire according to the present invention.

Figure 4 is a fragmentary sectional view, in perspective, of a white rib, white sidewall tire according to the present invention.

Referring to the drawings by characters of reference, there is shown, in Figure 1, the conventional construction of white rib white sidewall tire. A tire generally indicated at 1 is a vulcanized assembly of rubber coated fabric body 2, a tread portion 3, a non-staining black sidewall portion 4, a white sidewall portion 5, and non-staining black gum strip 6, partially overlapping a rib in the white sidewall. White sidewall portion 5 extends from a position well above the center of the sidewall of the tire to a position directly above bead portion 7 where it overlaps abrasion strip 8. White sidewall portion 5 is of thick construction for the reason, aforementioned, that sufficient migrating waxes must be incorporated in the white sidewall member to continuously replenish, by migration to the surface thereof, a supply of wax bloom, whereby to resist weather checking and radial cracking for the entire life of the tire. The portion of strip 6 overlapping the rib will be buffed off to leave a white rib of full width.

The conventional construction of a white rib white sidewall has been modified in accordance wtih the invention as shown in Figure 4 wherein a fragmentary view of a tire generally indicated at 20 illustrates a vulcanized assembly of fabric coated carcass 21, non-staining black sidewall portion 22 and white sidewall member 23. White sidewall member 23 may be substantially thinner than corresponding white sidewall portion 5 of Figure 1 for the reason that black sidewall portion 22 contains wax to migrate to and replace wax bloom lost from the white sidewall member 23 during tire operation as heretofore described. The black sidewall portion 22 is composed of a non-staining compound but is loaded with carbon black whereby abrasion resistance is attained to allow the lower edge of this portion to replace the conventional abrasion strip 8 of Figure 1. The replacement of the abrasion strip by the edge of the black sidewall portion eliminates an element from the tire construction with the accompanying elimination of extra factory operations and problems present when this abrasion strip is included. Also the reduction of the thickness of the white sidewall element 23 attains a material cost saving as heretofore pointed out. The construction of the present invention obviously simplifies and lends economy to factory building operations and provides as well an improved tire construction.

Referring to Figure 2, a conventional black rib white sidewall tire is shown wherein fabric carcass 30 integral with beads 31 is assembled by vulcanization with staining black sidewall 33, white sidewall 34, and black rib 35. As in Figure 1, so in Figure 2, white sidewall portion 34 is of thick construction to provide a reservoir for migrating wax although not extending as far up the sidewall of the tire as does white sidewall 5 in Figure 1. Black rib 35 is molded of a non-staining rubbery composition to protect white sidewall 34 from discoloration from black sidewall 33, the black sidewall being of a rubbery compound which would normally stain a white stock coming in contact therewith. Although the white sidewall member is foreshortened radially it is, in this form, of sufficient thickness to provide a reservoir of the migrating waxes which bloom to the sidewall surface during the entire period of road operation of the tire thereby to combat weather checking and radial cracking.

Figure 3 is a black rib white sidewall tire of the present invention wherein non-staining black sidewall 40 extends from the edge of the base of the tread not shown down the sidewall of the tire to bead 42, being bonded by vulcanization thereto as well as to fabric body 43. Superimposed upon non-staining black sidewall 40 is white sidewall veneer 44. The non-staining black sidewall 40 is comprised of any non-staining rubbery polymer such as crude natural rubber, non-staining GR–S type rubber or any other conventionally known non-staining polymer blended with the usual compound ingredients necessary to the conventional black sidewall composition but to which have been added a portion of a migrating waxy material. This waxy material is similarly found in white sidewalls 44 and 5, 34 and 23 and is incorporated in the black sidewall in order to supply the white sidewall veneer 44 with a reservoir of migrating wax to bloom to the surface and combat weather checking and radial cracking during subsequent tire life.

It is well known to those skilled in the art of tire manufacture that the fabric body portion of the white sidewall tire must contain no staining material which will migrate into adjacent portions of the tire and stain the light colored members thereof. The requirement of selecting non-staining migratory pigments for the construction of the fabric body of a white sidewall tire imposes a severe economic restriction upon the manufacture of these tires. Non-staining pigments are usually expensive while the use of cheaper staining pigments such as reclaim would lessen the cost of the tire. The use of a migration impervious barrier stock in the black sidewall portion between the stain producing fabric body and the stainable white veneer stock to preclude migration of staining pigments would make possible the use of the novel white sidewall construction on a cheaper black sidewall tire body. While the black sidewall portion described in the foregoing has been a non-staining type it would be advantageous to use a migration resistant, barrier type compound in the black sidewall portion. Such a stock is described in my copending application 281,213.

In the present novel construction the black sidewall stock extends from the base edge of the tread to the bead making unnecessary the non-staining black abrasion strip 8 and 36 along the bead of the tire at the position where the bead rides on the rim flange of the wheel. The abrasion strip may be eliminated in both the black rib white sidewall tire and the white rib white sidewall tire of this invention.

The white sidewall member of the invention can be of any thickness conveniently processed in the factory. The thinnest white veneer will give a satisfactory tire. However, the preferred form of the invention embodies a thickness of white stock equal in thickness to the underlying black member.

In describing the use of migrating waxy material which would normally bloom to the surface of rubbery members, it is not intended in this invention to be limited to any particular type of wax. A great number of different types with different melting points, colors, as well as other characteristics are known to those skilled in the art of rubber compounding. Any of these materials which would perform the required function by blooming to the surface of the rubbery material to provide a continuous flexible layer protecting against the deleterious effects of weather and flexing, can be used in this invention. Examples of some of these materials are paraffin, sunproof,[1] and heliozone.[2] It is not intended that the invention be limited to these waxes as was aforementioned.

It is to be understood that hereinbefore has been described preferred forms of the sidewall by way of example only. Various modifications and changes can be made without departure from the principles of the invention or the scope of the claims.

What is claimed is:

1. In a pneumatic light colored sidewall tire comprising a fabric body portion terminating in two inextensible bead portions and adhered to a rubbery tread portion, a sidewall comprised of an endless rubbery reservoir member abutting said tread and one of said beads, and a rubbery light colored member superimposed upon and bonded to said reservoir member, said reservoir member provided with a supply of migratory materials capable of protecting the surface of rubber from the deteriorating effects of weather.

2. In a pneumatic light colored sidewall tire comprising a fabric body portion terminating in two inextensible bead portions and adhered to a rubbery tread portion, a sidewall comprised of an endless rubbery reservoir member abutting at one edge said tread and at the other edge one of said beads, and a rubbery light colored member superimposed upon and bonded to said reservoir member, said reservoir member provided with a supply of migratory material capable of protecting the surface of rubber from the deteriorating effects of weather.

3. In a pneumatic light colored sidewall tire comprising a fabric body portion terminating in two inextensible bead portions and adhered to a rubbery tread portion, a side wall comprised of an endless rubbery reservoir member extending over a substantial portion of the sidewall area, and a rubbery light colored member superimposed upon and bonded to said reservoir member, said reservoir member provided with a supply of migratory material capable of protecting the surface of rubber from the deteriorating effects of weather.

4. In a pneumatic light colored sidewall tire composed of a rubbery fabric body portion compounded with migratory staining pigments terminating in two inextensible bead portions and adhered to a rubbery tread portion, a sidewall comprised of an endless rubbery reservoir member impervious to the migration of said staining pigments abutting at one edge said tread and at the other edge one of said beads, and a rubbery flat stainable light colored member superimposed and bonded to said reservoir member, said reservoir member provided with a supply of migratory material capable of protecting the surface of rubber from the deteriorating effects of weather.

5. In a pneumatic light colored sidewall tire comprising a fabric body portion terminating in two inextensible bead portions and adhered to a rubbery tread portion, a sidewall comprised of an endless rubbery reservoir member abutting said tread portion and one of said beads, and a rubbery light colored member superimposed on and bonded to said reservoir member, said reservoir member provided with a supply of migratory waxy materials capable of protecting the surface of rubber from the deteriorating effects of weather.

6. In a pneumatic light colored sidewall tire comprising a fabric body portion terminating in two inextensible bead portions and adhered to a rubbery tread portion, a sidewall comprised of an endless rubbery reservoir member extending over a substantial portion of the sidewall area and a rubbery light colored member superimposed upon and bonded to said reservoir member, said reservoir member provided with a supply of migratory waxy material capable of protecting the surface of rubber from the deteriorating effects of weather.

References Cited in the file of this patent

UNITED STATES PATENTS

| Number | Name | Date |
| --- | --- | --- |
| 1,940,077 | Coe | Dec. 19, 1933 |
| 2,566,328 | Hessney et al. | Sept. 4, 1951 |

[1] Product of Naugatuck Chemical Co.
[2] Product of E. I. du Pont de Nemours & Co.